United States Patent [19]

Berg et al.

[11] 4,326,995

[45] Apr. 27, 1982

[54] CATALYST FOR HYDROTREATING CARBONACEOUS LIQUIDS

[75] Inventors: Lloyd Berg; Frank P. McCandless, both of Bozeman, Mont.; Ronald J. Ramer, Idaho Falls, Id.

[73] Assignee: The United States of America as represented by the United States Department of Energy, Washington, D.C.

[21] Appl. No.: 101,361

[22] Filed: Dec. 7, 1979

[51] Int. Cl.$^3$ .......................... B01J 21/04; B01J 23/85; B01J 23/88
[52] U.S. Cl. .............................. 252/465; 208/216 PP; 208/254 H
[58] Field of Search .............................. 252/465, 439; 208/216 PP, 254 H

[56] References Cited

U.S. PATENT DOCUMENTS

| | | | |
|---|---|---|---|
| 3,719,588 | 3/1973 | Vernon et al. | 208/254 H |
| 3,814,684 | 6/1974 | Christman et al. | 208/216 PP |
| 4,008,149 | 2/1977 | Itoh et al. | 208/216 PP |
| 4,133,744 | 1/1979 | Mitchell et al. | 208/216 PP |
| 4,152,251 | 5/1979 | Mickelson | 252/465 X |
| 4,213,850 | 7/1980 | Riddick et al. | 252/439 X |

*Primary Examiner*—W. J. Shine
*Attorney, Agent, or Firm*—Hugh W. Glenn; Richard G. Besha; James E. Denny

[57] ABSTRACT

A catalyst for denitrogenating and desulfurating carbonaceous liquid such as solvent refined coal includes catalytic metal oxides impregnated within a porous base of mostly alumina with relatively large pore diameters, surface area and pore volume. The base material includes pore volumes of 0.7–0.85 ml/g, surface areas of 200–350 m$^2$/g and pore diameters of 85–200 Angstroms. The catalytic metals impregnated into these base materials include the oxides of Group VI metals, molybdenum and tungsten, and the oxides of Group VIII metals, nickel and cobalt, in various combinations. These catalysts and bases in combination have effectively promoted the removal of chemically combined sulfur and nitrogen within a continuous flowing mixture of carbonaceous liquid and hydrogen gas.

2 Claims, No Drawings

CATALYST FOR HYDROTREATING CARBONACEOUS LIQUIDS

CONTRACTUAL ORIGIN OF THE INVENTION

The invention described herein was made in the course of, or under, a contract with the UNITED STATES DEPARTMENT OF ENERGY.

BACKGROUND OF THE INVENTION

The present invention relates to methods and catalysts for the removal of chemically combined sulfur and nitrogen from carbonaceous liquids. Various carbonaceous liquids are contemplated such as those produced in the liquefaction of coal, oil shale, tar sands, etc.

Of particular interest are those carbonaceous liquids produced in the solvent refining of coal. One process for refining coal in this manner is operated by the Pittsburg and Midway Coal Mining Co. in Fort Lewis, Washington. In this process pulverized coal is mixed with recycled solvent or slurry, preheated and held in a dissolver in the presence of hydrogen gas, and further processed to produce fractions of synthetic natural gas, liquid petroleum gas, light distillate, fuel oil and inert ash. The light distillate is often identified as naphtha while the fuel oil fraction comprises middle and heavy distillate.

Unfortunately each of these liquid products, particularly the heavy distillate, include excessive amounts of chemically combined nitrogen and sulfur that make them unsuitable for use as boiler fuels and other applications. Typical levels by weight of 0.5–1.5% combined nitrogen and 0.2–0.8% combined sulfur are found. For boiler furnace fuels, these heavy fractions should be reduced to less than 0.5% nitrogen and 0.5% sulfur by weight. However, if the product is to be employed as a feedstock for a catalytic cracker, the nitrogen requirements are more stringent and are typically required in the range of 100–400 ppm to avoid poisoning hydrocracking catalysts. However a few hydrocracking units tolerate feedstock with nitrogen levels as high as 0.3 but no more than 0.4 weight percent. Previous catalytic materials for hydrotreating solvent refined coal liquids have proven inadequate in consistently denitrogenating to these low concentrations.

PRIOR ART STATEMENT

The following publications relate to catalysts for the hydrogenation of coal derived liquids but do not disclose the particular catalyst claimed in the present application for patent.

Fossil energy program report ERDA 76-10 "Catalyst for Upgrading Coal-Derived Liquids", page 303–304. This report shows the use of trickle bed reactors for catalytically hydrogenating and thereby removing sulfur and nitrogen from coal liquids, catalysts such as cobalt-molybdenum on alumina obtained from commercial venders are investigated. Solvent refined coal from Pittsburg and Midway Coal Mining Company is treated. Nitrogen removal is reported to be much more difficult than sulfur removal.

FE-2034-10 "Catalytic Hydrogenation of Coal Derived Liquids", interim report for the period Jan.-Mar. 1978, Berg and McCandless. Various commercial catalysts are tested for removing sulfur and nitrogen from coal derived liquids including such as oxides of nickel, cobalt and molybdenum on base materials of such as alumina are reported.

SUMMARY OF THE INVENTION

Therefore, in view of the above, it is an object of the present invention to provide effective catalysts for the denitrogenation and desulfurization of carbonaceous liquids containing chemically combined nitrogen and sulfur.

It is a further object to provide a catalyst for hydrotreating carbonaceous liquids containing over 1% nitrogen to produce a product with a less than 0.4% nitrogen content.

It is a further object to provide a catalyst for reacting hydrogen with chemically combined nitrogen in solvent refined coal liquid to produce a product having sufficiently low nitrogen content to be acceptable as a boiler furnace fuel or refinery feedstock.

It is a further object of the present invention to provide a process for the denitrogenation and desulfurization of carbonaceous liquids.

In accordance with the present invention, a catalyst is provided for the continuous flow hydrogenation of carbonaceous liquids containing chemically combined sulfur and nitrogen in carbonaceous compounds. The catalyst includes impregnated or deposited oxides of catalytic metals on a base comprising a major proportion of alumina with a pore volume of 0.6–0.85 ml/g, a surface area of 140–350 m$^2$/g and an average pore diameter of 80–200 Angstroms. The deposited oxides of catalytic metals include an oxide of tungsten, an oxide of nickel and an oxide of cobalt.

In more particular aspects of the invention, and base material is in the form of pellets and comprises in excess of 95 weight percent alumina with a surface area of 200–350 m$^2$/g, a pore volume of 0.70.85 ml/g and an average pore diameter of 85–160 Angstroms. The effective catalytic metal oxides deposited into this base material include $WO_3$ in 8–25% of total weight, CoO in 0.1–10% of total weight and NiO in 0.1–5% of total weight.

In one other particular aspect of the invention, the catalyst base material has a surface area of about 250 m$^2$/g, a pore volume of about 0.7 ml/g and an average pore diameter of 120–130 Å. The deposited oxides of catalytic metal on the base include in percent total weight 10–11% $WO_3$, 2–3% NiO, 6–7% CoO and 12–13% $MoO_3$.

In yet another aspect of the invention a catalyst is provided with a base material including a surface area of 210–220 m$^2$/g, a pore volume of 0.83–0.84 ml/g, a median pore diameter of about 161 Å and an average pore diameter of 150–160 Å. The base includes deposited oxides in percent of total weight of 20–22% $WO_3$, 2–3% NiO and 5–6% CoO.

One other aspect of the invention is a method of removing chemically combined nitrogen and sulfur from carbonaceous liquids which involves heating the liquid to a temperature above 300° C. in parallel-current flow with hydrogen gas at a pressure of at least 60 atm in the presence of a catalytic metal oxide on a porous base of refractory metal oxide. The catalytic metal oxide includes oxides of tungsten, cobalt and nickel impregnated into a porous base having a surface area of 200–325 m$^2$/g, a pore volume of 0.7–0.85 ml/g and an average pore diameter of 85–160 Angstroms.

DETAILED DESCRIPTION OF THE PREFERRED EMBODIMENT

The catalyst of the present invention is one that combines a catalyst base of sufficiently large surface area, pore volume and pore diameter with specific catalytic metals as oxides or sulfides to effectively denitrogenate the coal liquid to an acceptable level for refinery feedstock and boiler fuel. Liquefied coal is considered to be composed of very large molecules of the polyanthracene and other condensed benzene ring structures. To accommodate this type of molecule, the pore volume and pore diameter must be sufficiently large to permit the molecules to enter and contact active catalytic metals in the presence of hydrogen gas or another hydrogen donor for removing the nitrogen.

Carbonaceous liquids produced in the liquefaction of coal and other solid carbonaceous material include a variety of aliphatic and aromatic carbonaceous compounds. In products such as solvent refined coal, the resulting product liquid can still include condensed aromatic compounds with undesirable elements such as nitrogen and sulfur combined in hetero rings as well as in side chains. Although the hydrogen and sulfur levels may be somewhat reduced in the hydrogenation involved in the liquefaction steps, nitrogen levels in the range of 0.5-1.5% and sulfur levels of 0.2-0.8% by weight may appear.

In one manner of preparing the catalyst of the present invention, a suitable refractory oxide base material with sufficiently large pore diameter, surface area and pore volume is selected. A number of commercially available base materials have been found to be suitable and are listed below in Table I.

TABLE I

| | Base Description | | | |
|---|---|---|---|---|
| | SURFACE AREA(A) | PORE VOLUME(V) | PORE DIAMETER(A) | |
| BASE | $m^2/g$ | ml/g | Median | Average(4V/A) |
| Norton | 250.0 | .7000 | — | 125.0 |
| A | 323.2 | .7183 | 90.2 | 88.9 |
| B | 232.4 | .7215 | 137.3 | 124.2 |
| C | 214.6 | .8397 | 161.0 | 156.5 |
| D | 211.4 | .7943 | 190.0 | 150.0 |
| E | 146.95 | .6841 | 420.2 | 186.2 |
| ** | 300.0 | .7600 | — | 101.3 |

| | PELLET | COMPOSITION WT % | | |
|---|---|---|---|---|
| BASE | SIZE(mm) | $Al_2O_3$ | $SiO_2$ | $P_2O_5$ |
| Norton | 1.6 | 99.85 | 0.12 | |
| A | 0.79 | 96.0 | 4.0 | |
| B | 1.6 | 100.0 | | |
| C | 0.79 | 98.0 | 2.0 | |
| D | 1.6 | 91.0 | | 9.0 |
| E | 1.6 | 83.0 | | 17.0 |
| ** | 1.6 | 97.6 | 2.4 | |

**This is the base for Nalcomo 477 of Comparative Example I.

In Table I the average pore diameters are found by assuming pores of cylindrical shape. Where the average and median pore diameters differ by larger values as in Base E, pores of other than cylindrical shape may be present, e.g. hourglass-shaped. Such constrictions in the pores may limit access to the contained catalytic metals.

The selected base material is impregnated with an aqueous solution of salts of the desired concentrations of catalytic metals. For instance, ammonium molybdate, cobalt nitrate, ammonium tungstate-meta and nickelous nitrate can be used. Agitated contact is desirable to thoroughly and uniformly mix the catalytic metal solution into the base material. The base with catalyst is then dried in air at an elevated temperature of, for instance, about 110° C., for about 8 hours and then calcined at about 450° C. for about 8 hours to produce oxides of the catalytic metals within the pores of the base material.

Prior to use, the catalytic oxides are sulfided to prevent reduction of their activity by hot hydrogen. The catalysts and base are heated to an elevated temperature of, for instance, 300°-350° C. and contacted for about 12 hours with a flow of hydrogen sulfide in hydrogen gas, e.g. about 10% by volume hydrogen sulfide.

The various catalysts prepared in this manner were tested by filling them into a tubular reactor and passing a flow of hydrogen gas and carbonaceous liquid containing combined nitrogen and sulfur through the reactor. Hydrogen is used at a pressure of at least 60 atmospheres in amounts of about 5000-10,000 standard cubic feet per barrel of carbonaceous liquid feed. The gas and liquid are in parallel flow to enhance distribution of the liquid over the catalyst at high flow rates. The liquid flow rate in respect to the catalyst volume is sufficiently low to provide a liquid hourly space velocity of no more than 2 and preferably in the range of 0.5-2. This insures adequate reaction time in the presence of the catalyst to carry out the denitrogenation and desulfurization reactions.

It was found that after operating the catalyst for a period of 2-5 hours of continuous flow at these hourly space velocities that carbon deposits were formed to interfere with flow rate and catalytic activity. Following this period of time the catalysts are removed from the reactor, ignited in air to combust the carbon deposits and retreated with a gas containing hydrogen and about 10% by volume hydrogen sulfide to resulfide the catalytic metals.

Although the catalytic metals are formed on the base material as the oxide and are for convenience reported as compositions in the oxide form, it will be understood that, due to the presulfiding treatment, the actual catalytic material operating within a denitrogenation and desulfurization reactor will at least partially be in the sulfide form. Therefore, for purposes of this application, concentrations of catalytic materials expressed as oxides also contemplate equivalent concentrations of corresponding sulfides. For example, in the sulfide form tungsten can be present as $WS_3$, molybdenum as $MoS_3$, cobalt as $CoS$ and nickel as $NiS$.

The catalyst of the present invention includes a combination of bases having large pore diameters, pore volumes and surface area with impregnated catalytic metal compounds. The catalytic metals are in the oxide or sulfide form within the catalyst. It has been found that catalysts prepared with oxides of tungsten, cobalt and nickel as well as other metals including molybdenum are capable of denitrogenating coal liquids to levels below 0.4 weight percent. The following examples illustrate specific combinations of base materials and catalytic metals to carry out the removal of nitrogen and sulfur from a heavy distillate fraction of solvent refined coal containing about 1.17 weight percent nitrogen and 0.53 weight percent sulfur.

EXAMPLE I

Comparative Example

About 60 cc of catalyst mixed with about an equal volume of inert support, e.g. ⅛ inch Denstone inert available from the Norton Company, was contacted in a tubular reactor with a parallel flow of the solvent refined coal liquid and hydrogen gas. The carbonaceous liquid flow was sufficient to provide a liquid hourly space velocity of about 1 and the hydrogen gas flow was sufficient to give about 10,000 SCF per barrel of liquid. The reactor was operated at about 85-100 atmospheres pressure and 390°-430° C. temperature. The catalyst included 14% total weight (excluding inert mix) MoO₃ and 3.3% total weight CoO impregnated into a base of 97.6 weight % alumina and 2.4 weight % silica. After running for a period of 3 hours, the reactor continued to provide about 60% denitrogenation and 71% desulfurization (0.47% nitrogen and 0.21% sulfur). After 6 hours, only 24% denitrogenation and 66% desulfurization was obtained. The run with this catalyst provides a representation of the best results obtained by the inventors with commercially available catalysts for the denitrogenation and desulfurization of this coal liquid.

EXAMPLE II

Approximately the same volume of catalyst as employed in the reactor of Example I was used at the same temperatures and pressures. The base material listed as A in Table I was impregnated with 19.5% WO₃, 3.6% NiO and 5.7% CoO. After operating this reactor for 2½ hours, 80% denitrogenation (0.23 weight % nitrogen) was obtained along with 73.5% desulfurization (0.195% sulfur). After 4 hours, denitrogenation remained at 85.5% but desulfurization dropped to 34.7%. After 5 hours, the denitrogenation also dropped somewhat to 52%.

EXAMPLE III

A catalyst on the base listed as Norton in Table I includes as impregnated oxides 10.3% of total weight WO₃, 2.8% of total weight NiO, 6.8% of total weight CoO and 12.6% of total weight MoO₃. After 2 hours of operation under substantially the same conditions as Example I, 92% denitrogenation (0.09% nitrogen) and 79.6% desulfurization (0.15% sulfur) were found.

EXAMPLE IV

Catalytic oxides on the base listed as B in Table I are included in amounts sufficient for 20% total weight WO₃, 3.2% total weight NiO and 5.5% total weight CoO. After 2 hours of operation substantially similar to that of Example I, 76.9% denitrogenation (0.27% nitrogen) and 74.8% desulfurization (0.185% sulfur) occurred in the reactor operation.

EXAMPLE V

A catalyst containing 21.5% total weight WO₃, 2.9% total weight NiO and 5.9% total weight CoO on the base listed as C in Table I provided 90.6% denitrogenation (0.11% nitrogen) and 78.2% desulfurization (0.16% sulfur) after 2 hours of operation under substantially the conditions of Example I.

EXAMPLE VI

A catalyst containing 22.6% total weight WO₃, 3.4% total weight NiO and 5.4% total weight CoO on the base indicated as A in Table I was used under substantially the same conditions as in Example I except that about 3 times the volume of catalyst and inert mix were used but with only 6700 SCF hydrogen flow per barrel of carbonaceous liquid. The catalyst operated for more than an hour with denitrogenations in excess of 80% and desulfurizations in excess of 70% but at 2 hours operation had fallen to 66.7% denitrogenation (0.39% nitrogen) and held at 74.4% desulfurization (0.188% sulfur).

EXAMPLE VII

About 9.2% total weight WO₃, 9.8% total weight MoO₃, 0.3% total weight NiO and 1.4% total weight CoO was operated for 2 hours on the base designated E in Table I under substantially the conditions of Example I and was providing a carbonaceous liquid product with 0.3 weight % nitrogen and 0.23 weight % sulfur, but earlier readings in excess of this nitrogen level had been noted.

EXAMPLE VIII

A catalyst on a base designated D in Table I is operated under substantially the conditions of Example I. The catalyst included 19.7% total weight WO₃, 6.0% total weight CoO and 3.1% total weight NiO. After 2 hours carbonaceous liquid product included 0.36% nitrogen and 0.12% sulfur. However, after 3 hours the liquid included 0.7% nitrogen and 0.18% sulfur, indicating that the catalyst needed to be regenerated.

The examples illustrate that catalyst impregnated into a base of large pore size that is of 80-200 Angstroms and preferably 85-160 Angstroms having a pore volume of 0.6-0.85 ml/g, but preferably in the range of 0.7-0.85 ml/g, and a surface area of 140-350 m²/g, preferably 200-350 m²/g, can provide openings and surface area sufficiently large to promote reaction of the condensed aromatic compounds containing nitrogen and sulfur with hydrogen to obtain liquid with extremely low nitrogen and sulfur concentrations. These bases, however, must be impregnated with selected catalytic metals at concentrations given in oxide form to promote these desulfurization and denitrogenation reactions. It has been found that for this improvement the catalyst will include tungsten, nickel and cobalt and may also include metals such as molybdenum. A preferred concentration is seen to be 8-25% by weight WO₃, 0.1-10% of total weight CoO and 0.1-5% of total weight NiO. A narrower preferred range of these impregnated catalytic compounds will more closely correspond to those given in the above examples. Examples II, III, IV, V and VI considered together show advantageous results for the more specific catalyst weight concentrations of 8-25% WO₃, 5-7% CoO and 2-4% NiO by weight.

It is therefore seen that the present invention provides a catalyst for reducing nitrogen levels of solvent refined coal liquids to levels below 0.4 weight % to increase their suitability for use as petroleum feedstock or as boiler furnace fuel. Specific preferred concentrations of tungsten, cobalt and nickel in oxide form on large surface area and pore diameter base materials are presented.

It will be clear that various modifications to the materials and procedures presented above can be made by those skilled in the art within the scope of the appended claims.

The embodiments of the invention in which an exclusive property or privilege is claimed are defined as follows:

1. In a catalyst for the continuous-flow hydrogenation and denitrogenation of carbonaceous liquids produced in the solvent refining of coal containing combined sulfur of 0.2–0.8% and combined nitrogen of 0.5–1.5% by weight within carbonaceous compounds, said catalyst having a base comprising a major proportion of alumina with deposited oxides of catalytic metals, the improved combination comprising a base material that includes a surface area of about 250 m²/g, a pore volume of about 0.7 ml/g and an average pore diameter of 120–130 Angstroms and said deposited oxides of catalytic metal include in percent total weight 10–11% $WO_3$, 2–3% NiO, 6–7% CoO and 12–13% $MoO_3$.

2. In a catalyst for the continuous-flow hydrogenation and denitrogenation of carbonaceous liquids produced in the solvent refining of coal containing combined sulfur of 0.2–0.8% and combined nitrogen of 0.5–1.5% by weight within carbonaceous compounds, said catalyst having a base comprising a major proportion of alumina with deposited oxides of catalytic metals, the improved combination comprising a base material that includes a surface area of 210–220 m²/g, a pore volume of 0.83–0.84 ml/g, a median pore diameter of about 161 Angstroms and an average pore diameter of 150–160 Angstroms and said deposited oxides of catalytic metals include 20–22% total weight $WO_3$, 2–3% total weight NiO, and 5–6% total weight CoO.

* * * * *